No. 689,529. Patented Dec. 24, 1901.
F. L. WOLFE.
RECORDING GAGE.
(Application filed Mar. 14, 1900.)
(No Model.)
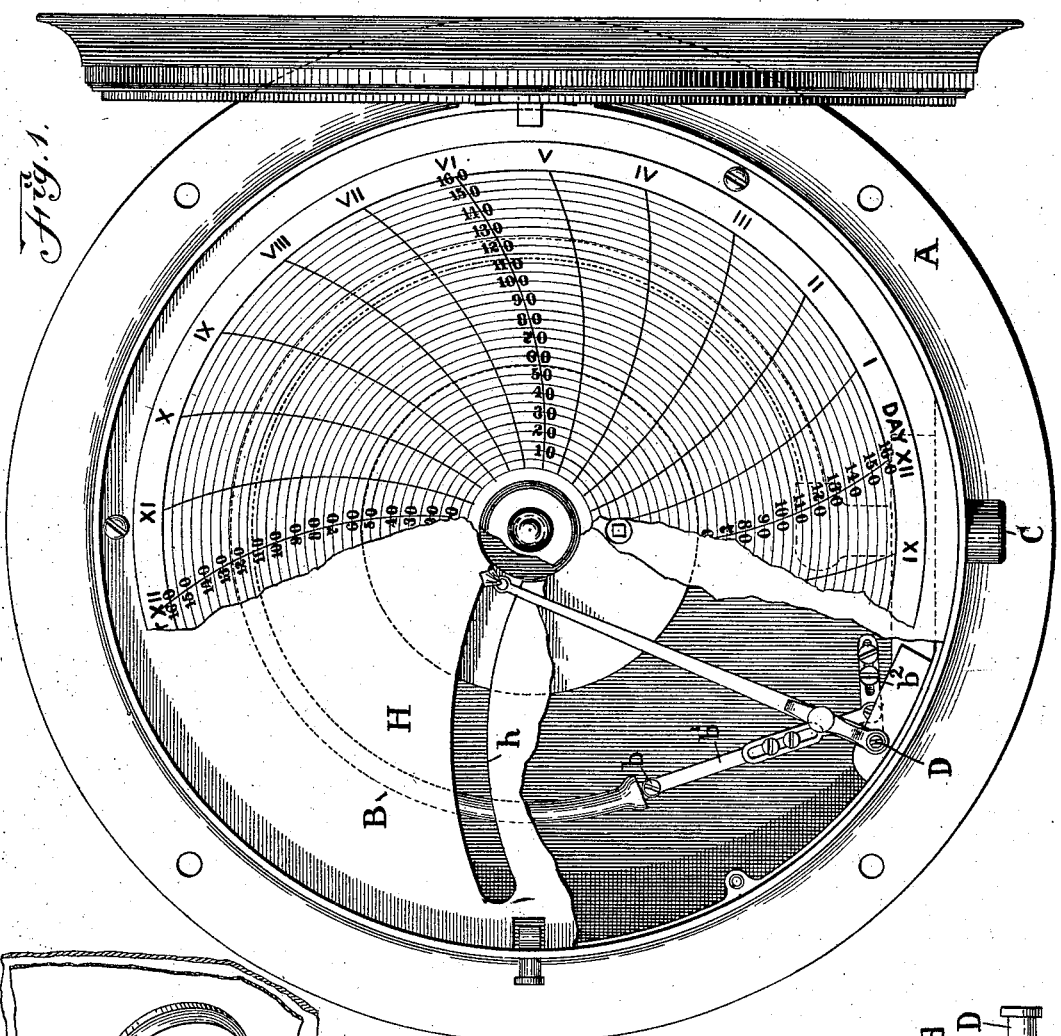
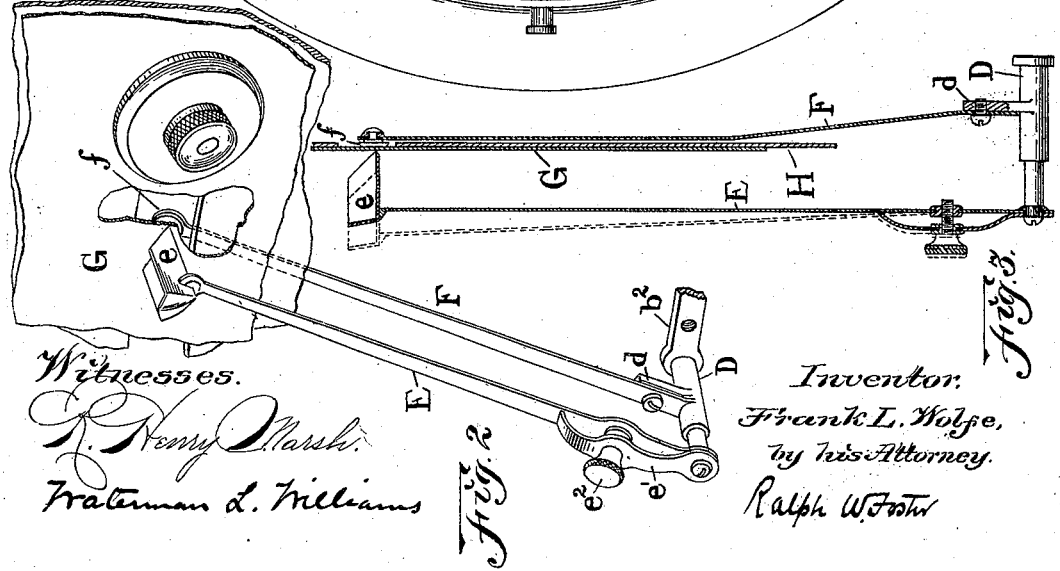
Witnesses.
R. Henry Marsh.
Fraterman L. Williams
Inventor.
Frank L. Wolfe,
by his Attorney.
Ralph W. Foster
THE NORRIS PETERS CO., PHOTO-LITHO., WASHINGTON, D. C.

UNITED STATES PATENT OFFICE.

FRANK L. WOLFE, OF MEDFORD, MASSACHUSETTS, ASSIGNOR TO THE CROSBY STEAM GAGE & VALVE COMPANY, OF BOSTON, MASSACHUSETTS, A CORPORATION OF MASSACHUSETTS.

RECORDING-GAGE.

SPECIFICATION forming part of Letters Patent No. 689,529, dated December 24, 1901.

Application filed March 14, 1900. Serial No. 8,643. (No model.)

*To all whom it may concern:*

Be it known that I, FRANK LESLIE WOLFE, a citizen of the United States, and a resident of Medford, in the county of Middlesex and State of Massachusetts, have invented certain new and useful Improvements in Recording-Gages, of which the following is a specification.

My invention relates to recorders, and more particularly to a pen-platform adapted to support the chart immediately below the pen and to travel simultaneously with the pen, always occupying the same relative position thereto.

The object of the invention is to secure a uniform pressure of the pen upon the chart and to obtain in this way clear and accurate records. Ordinarily the chart is supported by a stationary disk, and by means of a clock-movement is made to rotate about the center of the disk. This disk is the platform against which the pen presses the chart and is of about the same diameter as the chart. Owing to its size it is very difficult to adjust the disk in the proper plane and more difficult still to preserve the adjustment, because of the disturbances that occur in transporting and attaching the recorder and those due to ordinary wear. Experience shows that, as the result, the pen acts with a varying pressure, sometimes failing to make any contact with the chart and sometimes contacting so strongly as to fairly drag, and the records thus made are unreliable. I obviate these difficulties by providing an additional traveling platform, which is illustrated by the accompanying drawings, in which similar letters refer to similar parts throughout.

Figure 1 is a front view of a recording-gage with the glass thrown open and with certain portions removed to show the internal construction. Fig. 2 is a perspective view, enlarged, showing the arrangement of pen and traveling platform. Fig. 3 is a sectional view, partly in elevation, showing the same thing.

A is the case of the usual recording-gage.

B is the usual Bourdon-tube spring anchored in the socket C. The other end of this Bourdon-tube spring has a tip $b$, which is attached to the link $b'$, adjustably attached to the link $b^2$, attached to the shaft D, furnished with the lug $d$. The shaft D is mounted in bearings in the gage-case in the usual way. To the top of this shaft is attached the pen-arm E, having at its other end the pen $e$. To the shaft D is also fixed the adjusting device $e'$, with its nurled screw $e^2$. To the lug $d$ is fixed the traveling-platform arm F, carrying at its other end the traveling platform $f$.

G is the chart.

H is the stationary platform or disk, having the slot $h$, which is an arc of the same radius as that described by the pen and traveling platform in their movement.

The operation of my device is as follows: When the parts are assembled, the pen-arm is located above the platform-arm in the same vertical plane, bringing the point of the pen over the center of the platform with just space enough between them to admit the chart, the upper surface of the traveling platform being in the same horizontal plane with the upper surface of the stationary platform. The pen is adjusted micrometrically by turning the nurled screw $e^2$, as described. As the shaft D is rotated by the mechanism described, the pen and platform are carried by it, moving in parallel arcs and remaining in constant and unvarying contact with the chart, as explained, so that the pressure of the pen against the chart remains constant and the records become even and accurate.

Having described my invention, what I claim, and desire to secure by Letters Patent, is—

1. In a recording-gage the combination; with the pen, penholder, penholder-support, and a chart; of a pen-platform resting directly against the chart and attached to said support, and adapted to travel simultaneously with the pen occupying at all times the same relative position thereto; together with means for adjusting the distance between the pen and its platform, and means for actuating said support; substantially as described.

2. In a recording-gage the combination;

with the pen, penholder, penholder-support, and a chart; of a pen-platform resting directly against the chart and attached to the said support, and adapted to travel simultaneously with the pen occupying at all times the same relative position thereto; together with means for actuating said support; substantially as described.

3. In a recording-gage the combination; with a traveling pen and a chart; of a traveling platform resting directly against the chart; together with means for actuating said pen and platform in such manner as to maintain their relative position to each other; substantially as described.

4. In a recording-gage the combination; with a traveling pen and a chart; of a traveling platform resting directly against the chart; together with means for adjusting the distance between the pen and the platform, and means for actuating said pen and platform in such manner as to maintain their relative position to each other; substantially as described.

5. In a recording-gage the combination; with a traveling pen and a chart; of a traveling platform resting directly against the chart; substantially as described.

6. In a recording-gage the combination; with a chart, traveling pen, and traveling platform resting directly against the chart; of a stationary chart-support slotted as and for the purposes set forth; substantially as described.

7. In a recording-gage the combination; with the pen, penholder, and penholder-support; of a pen-platform adapted to rest directly against a chart and attached to said support, and adapted to travel simultaneously with the pen occupying at all times the same relative position thereto; together with means for adjusting the distance between the pen and its platform, and means for actuating said support; substantially as described.

8. In a recording-gage the combination; with the pen, penholder, and penholder-support; of a pen-platform adapted to rest directly against a chart and attached to the said support, and adapted to travel simultaneously with the pen occupying at all times the same relative position thereto; together with means for actuating said support; substantially as described.

9. In a recording-gage the combination; with a traveling pen; of a traveling platform adapted to rest directly against a chart; together with means for actuating said pen and platform in such manner as to maintain their relative position to each other; substantially as described.

10. In a recording-gage the combination; with a traveling pen; of a traveling platform adapted to rest directly against a chart; together with means for adjusting the distance between the pen and the platform, and means for actuating said pen and platform in such manner as to maintain their relative position to each other; substantially as described.

11. In a recording-gage the combination; with a traveling pen; of a traveling platform adapted to rest directly against a chart; substantially as described.

12. In a recording-gage the combination; with a traveling pen and a traveling platform adapted to rest directly against a chart; of a stationary chart-support slotted as and for the purposes set forth; substantially as described.

In testimony whereof I have affixed my signature in presence of two witnesses.

FRANK L. WOLFE.

Witnesses:
WATERMAN L. WILLIAMS,
RALPH W. FOSTER.